ent Office 3,353,577
Patented Nov. 21, 1967

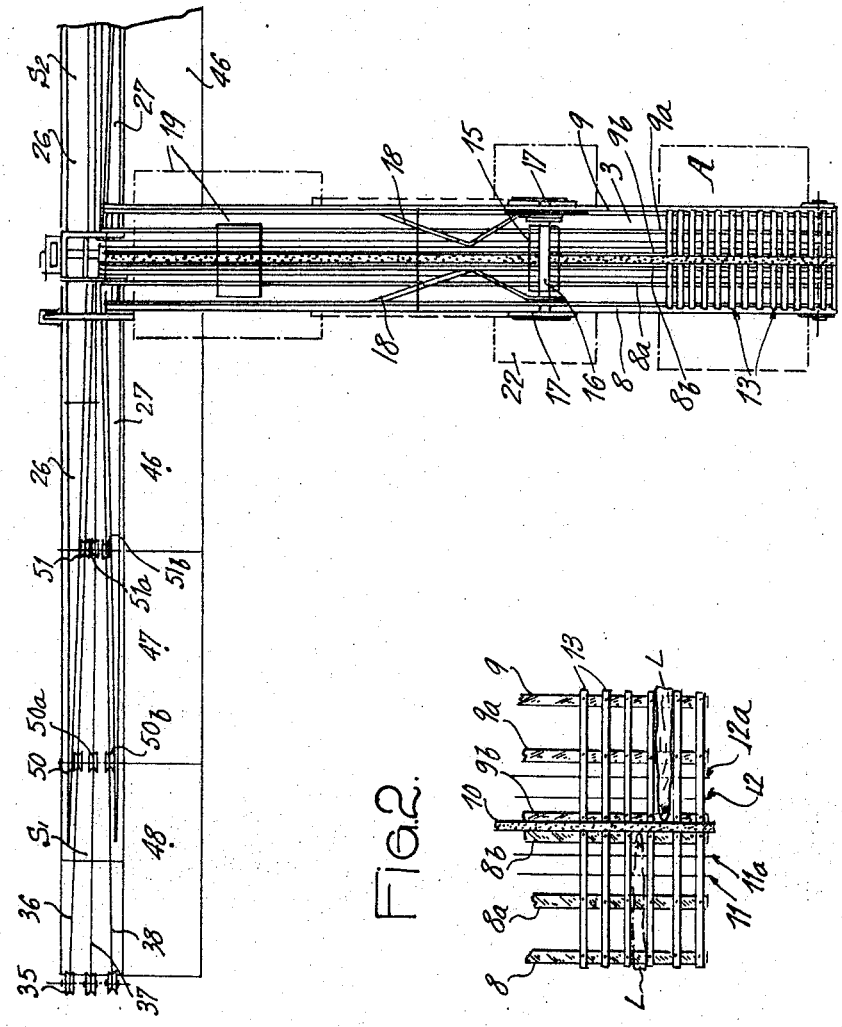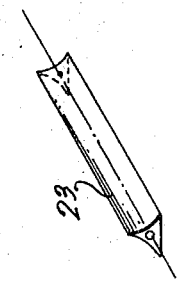

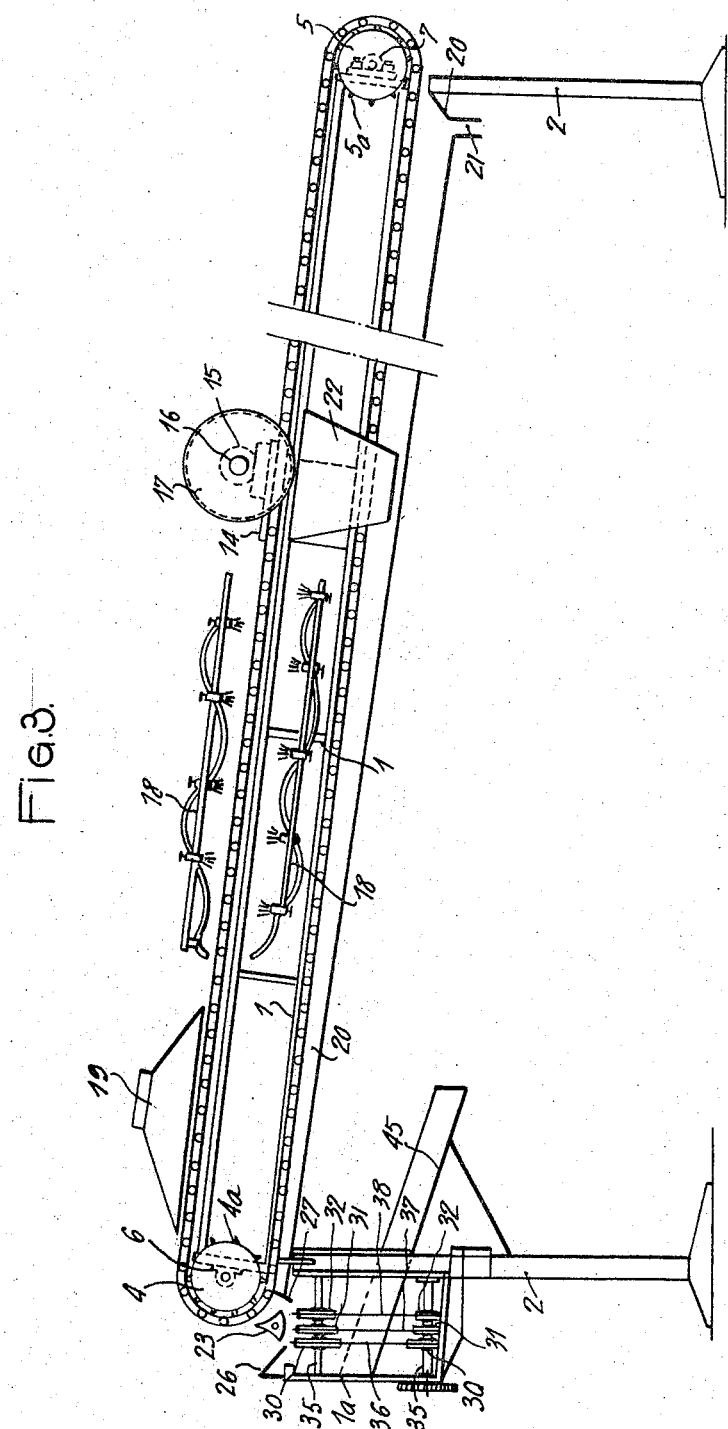

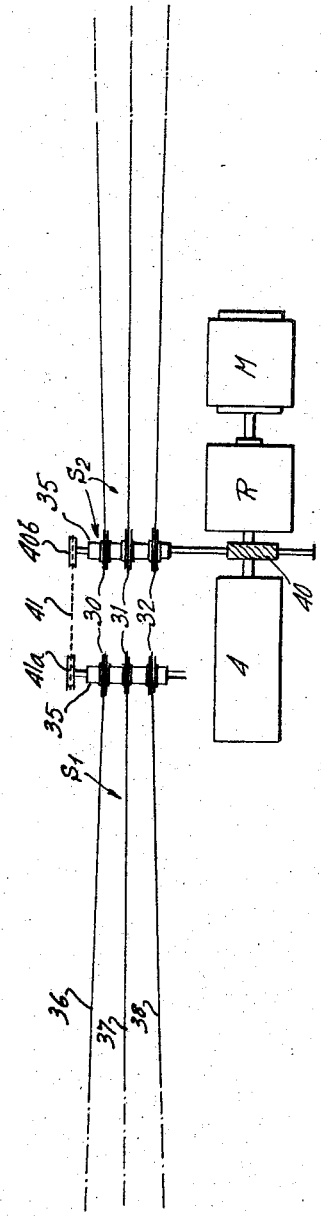
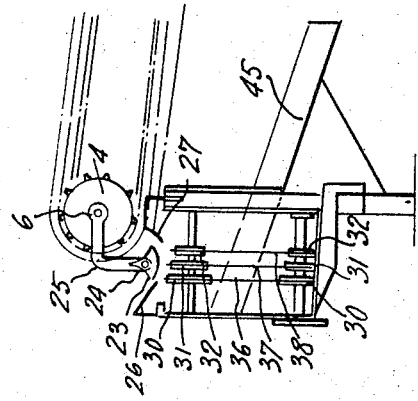

3,353,577
MACHINE FOR CLEANING AND CALIBRATING VEGETABLES, MORE PARTICULARLY ASPARAGUS
Yvon Bruel and Alain Bruel, both of Domaine due Petit Chaumont, Aigues-Mortes, France
Filed Mar. 26, 1965, Ser. No. 443,044
Claims priority, application France, May 19, 1964, 2,017, Patent 1,395,455
4 Claims. (Cl. 146—81)

ABSTRACT OF THE DISCLOSURE

The present invention has for its object a machine allowing to cut to a desired length, wash, dry and then sort vegetables having a shape similar to a more or less long cylinder. It is quite especially adapted to the preparation and the calibration of asparagus which, according to the different countries where they are to be eaten, must have various lengths and must be sorted as a function of the thickness thereof.

According to this invention, said machine includes a T-shaped frame, of which the slightly tilted vertical part includes at least one travelling band comprising narrow flat continuous bands, receiving transversely, at intervals, cylindrical elements, while the horizontal part of the T comprises at least two conveyors constituted by continuous divergent belts which are disposed above spouts leading to selecting compartments; there is provided above the travelling band forming the vertical part of the T at least one elongated washing device and at least one drying device, while at least one circular knife member is disposed upstream of said devices, whereby to shear the vegetable foot portions, and a spout, disposed under said knife member, receives the vegetable scraps.

Various other characteristics of this invention will be revealed when reading the following detailed description made with reference to the accompanying drawings, in which:

FIGURE 1 is a diagrammatical plane view of the machine showing from above the right part thereof, which is identical and symmetrical to the left part being only partly shown.

FIGURE 2 is a plane view on a larger scale showing one of the travelling bands which constitute one of the parts of the machine.

FIGURE 3 shows the machine partly in elevation and partly in section.

FIGURE 4 is a perspective view of one of the elements of the machine.

FIGURE 5 shows how the element in FIGURE 4 is mounted on the machine.

FIGURE 6 shows the diagrammatical chain of the machine.

Referring now to the drawings, it can be seen in FIG. 1 that the machine, which has in plane generally the shape of a T, is supported by a frame 1 resting on a supporting stand unit 2 of which the front feet carry also a secondary frame 1a, the latter carrying band conveyors constituting the horizontal part of the T.

The vertical part of the T, which is the inlet portion of the machine, is constituted by a band conveyor 3 comprising a powered or driving drum 4 and a driven drum 5. Said both drums are mounted on respective bearings 6 and 7 made fast to the frame 1 of the machine.

In the present case, said conveyors comprise six bands 8, 8a, 8b, 9, 9a, 9b, the bands 8b and 9b being separated by an intermediate flexible band 10 having a substantial height.

Wires or cables 11, 11a, 12, 12a complete the supporting surface of the double conveyor. Cylindrical elements 13, made either as small bars or as small tubes, are attached on both parts of the endless conveyor at equal distances and thus form, with the different bands and cables, two parallel chains separated by the vertical band 10. Around the periphery of drums 4 and 5 extends a row of tooth members 4a and 5a which mesh with the two above-described chains whereby to avoid any sliding of the latter. The frame 1 carries at its upper part a plate 14 on which is mounted a small electrical motor 15, the output shaft 16 of which rotates two cutting blades 17. Said frame 1 carries also two washing ramps or bars 18 which are fast to the latter and are used to spray washing liquids on and under the upper run of the double conveyor. Finally, the reference 19 indicates a drying device disposed above the conveyor.

Under the frame 1 is disposed a spout 20 adapted to collect the water and washing scraps to carry them towards a drain pipe 21. The reference 22 indicates a collecting spout the function of which will be explained later.

At the upper portion of the vertical part of the T, at the end of the above-described double chain, there is disposed an element 23 (FIG. 5) having generally the shape of a triangular prism, which is mounted idle on pins 24 integral with a frame 25 connected to the bearings 6 of drum 4. Two downwardly sloping surfaces 26 and 27 are disposed on either side of element 23 and above both endless conveyors $S_1$ and $S_2$ constituted by three sets of pulleys 30, 31 and 32 mounted on shafts 35, and cables 36, 37 and 38 run respectively around said pulleys of which one set is positively driven as shown in FIG. 6.

It may be noticed, as shown in FIG. 1, that the cables 36, 37 and 38 diverge from the central zone of the machine towards the ends thereof, whereby to leave an increasing space therebetween so that the sorting of the vegetables may take place.

FIGURE 6 shows a motor M which operates, through a speed reducing gear R, the double chain constituting the vertical part of the T. In effect, the shaft of drum 4 is rotated from the reducing gear R, which, through a gearing unit (e.g. a tangent wheel and worm device), rotates the powered set of the pulleys of conveyor $S_2$. Then, the motion is transmitted to conveyor $S_1$ by two sprocket wheels 41a and 41b around which runs a chain 41.

This machine operates as follows:

When it is desired to sort, for example, asparagus, the following procedure is to be followed. The motor M is turned on and thus drives the double chain constituting the vertical part of the T. This causes the band conveyors $S_1$ and $S_2$ to function. Workers place in the zone A (FIG. 1) a load of asparagus L (FIG. 2) so that the foot portions thereof are disposed at the external side of the chains, the tip of the asparagus being placed against the flexible band 10. The rotation of motor M causes the knife members 17 to rotate and to cut the feet of the asparagus which become thus cut to the desired length. The scraps fall downwardly into the spout 22. When the asparagus come under and over the respective elongated washing devices 18 which spray the water they are cleaned thereby, then upon arriving under the dryer 19 they are dried thereby. Then, the asparagus fall by gravity at the end of the double chain on the element 23 which, owing to its position, throws the asparagus either on the surface 26 or on the surface 27, alternatively, since said element 23 is mounted idle on the pins 24. This arrangement thus avoids any straddling of the asparagus, which would result in disturbing the operation of the machine. Said surfaces 26 and 27 feed the asparagus either on conveyor $S_1$ or on conveyor $S_2$, and thus the asparagus are correctly transported until the point where their diameters being less than the spacing between the cables 36, 37 and 38, they fall, by moving downwardly along inclined surfaces 45 (FIG. 3), into containers or boxes 46, 47 and 48 (FIG. 1) from which they can be taken again to be packaged, since the asparagus are sorted according to the thickness thereof. Said boxes 46, 47 and 48 may also constitute the final packagings of the asparagus.

Since the double chain provides for a shearing to a desired length, the washing and drying devices include means for reducing or increasing the tension of said chains, and the same is true for conveyors $S_1$ and $S_2$, of which the pins which carry the pulleys 30, 31 and 32 may be adjusted whereby to insure a sufficient tension in the cables 36, 37 and 38. It will be also noticed that sets of pulleys 50, 50a, 50b and 51, 51a and 51b are disposed under the upper portion of the runs of the cables 36, 37 and 38 of conveyors $S_1$ and $S_2$, so as to tighten sufficiently said runs which thus have no risk of collapsing, which would result in a slackening, a bad sorting and a bad calibrating.

There has been shown in the above a sorting by three classes, but it is evident that a sorting could be contemplated by less or more than three classes, according to the needs. Also, the spacing of the cutting blades 17 is adjustable so that the vegetables may be cut into difference lengths which may be brought to regulation in some cases.

The dryer 19 may be of any suitable type and it is in general provided with a fan for facilitating the drying of the vegetables throughout the surface thereof.

According to the speed of rotation imparted to the machine, which may be adjusted at will by using as a speed reducing device a suitable gear box, a more or less working speed may be obtained as a function of the speed for feeding the machine with vegetables.

Various modifications may be brought to the embodiment described and shown in detail, without going outside of the scope of this invention.

We claim:
1. In combination in a machine for cleaning and calibrating asparagus:
   (1) a first vertical support;
   (2) a second vertical support;
   (3) a first frame having an output end higher than its input end and resting on said supports, said frame having a double conveyor comprising an upper and a lower run travelling on a driven drum; said conveyor comprising at least two bands separated by an intermediate continuous flexible band having a height greater than said first two bands;
   (4) a pair of cutting blades mounted on said first frame for cutting asparagus to a desired length;
   (5) a pair of washing ramps for spraying wash liquids in and under said upper run of said double conveyor;
   (6) Drying means positioned above said double conveyor between said output end and said washing means;
   (7) a second horizontal frame positioned below said higher end of said first frame resting on said second support and carrying a pair of driven endless sorting conveyors;
   (8) a selecting element constituted by a freely rotatable triangular prism-shaped member above said sorting conveyors and below said double conveyor for receiving cut asparagus therefrom;
   (9) a pair of downwardly sloping surfaces disposed on either side of said selecting element above said sorting conveyors for alternately receiving asparagus thrown by said selecting element and thereby feeding said asparagus to one or the other of said sorting conveyors.

2. The machine as claimed in claim 1, having a first spout under said lower run of said double conveyor for collecting water and washing scraps and a second spout under said cutting blades for collecting the feet of asparagus cut thereby.

3. The machine of claim 1, wherein said cutting blades are adjustable.

4. The machine of claim 1, wherein said sorting conveyors consist of thin endless cables diverging toward the outside.

References Cited
UNITED STATES PATENTS

| | | |
|---|---|---|
| 1,257,719 | 2/1918 | Low et al. |
| 2,310,358 | 2/1943 | Emmons et al. _____ 146—81 |
| 3,002,618 | 10/1961 | Derderian et al. _____ 209—102 |

FOREIGN PATENTS 548,689  9/1956  Italy.

WILLIAM W. DYER, Jr., *Primary Examiner.*
W. GRAYDON ABERCROMBIE, *Examiner.*